United States Patent [19]

Berry et al.

[11] Patent Number: 4,657,346

[45] Date of Patent: Apr. 14, 1987

[54] OPTICAL PACKAGES INCLUDING FIBER SEALS

[75] Inventors: Robert W. Berry, Bethlehem; Stanley Kaufman, Northampton; Friedrich Zwickel, Whitehall, all of Pa.

[73] Assignees: American Telephone and Telegraph Company, Berkeley Heights; AT&T Technologies and AT&T Bell Laboratories, Murray Hill, both of N.J.

[21] Appl. No.: 581,569

[22] Filed: Feb. 21, 1984

[51] Int. Cl.⁴ .................................................. G02B 6/36
[52] U.S. Cl. .................................. 350/320; 49/506; 156/294; 156/295; 350/96.20
[58] Field of Search ............... 350/96.20, 96.21, 96.22, 350/320; 49/498, 506; 174/77 R; 202/269; 156/166, 293, 294, 295, 296

[56] References Cited

U.S. PATENT DOCUMENTS

| | | | |
|---|---|---|---|
| 2,964,437 | 12/1960 | Appleton et al. | 156/295 X |
| 4,119,363 | 10/1978 | Camlibel et al. | 350/96.20 |
| 4,337,995 | 7/1982 | Tanaka et al. | 350/96.20 |
| 4,389,086 | 6/1983 | Furusawa et al. | 350/96.20 |
| 4,413,881 | 11/1983 | Kovats | 350/96.20 |
| 4,421,383 | 12/1983 | Carlsen | 350/96.21 |
| 4,432,603 | 2/1984 | Morency et al. | 350/96.21 |
| 4,514,590 | 4/1985 | Kyle | 156/294 X |

FOREIGN PATENT DOCUMENTS

| | | | |
|---|---|---|---|
| 0026139 | 4/1981 | European Pat. Off. | 350/96.20 |
| 56-113113 | 9/1981 | Japan | 350/96.20 |

*Primary Examiner*—John Lee
*Attorney, Agent, or Firm*—Lester H. Birnbaum

[57] ABSTRACT

Disclosed is a method and resulting package which provide an optical fiber seal. One or more fibers are fed through a housing utilizing an apertured insert with a fiber located in each aperture. The housing preferably includes adjacent openings having unequal diameters. A sealing material, such as epoxy is deposited in the larger opening, and/or in the apertures, and the insert is pushed into that opening. The sealing material is thereby forced through the small opening and also into the apertures of the insert to seal the fibers.

10 Claims, 3 Drawing Figures

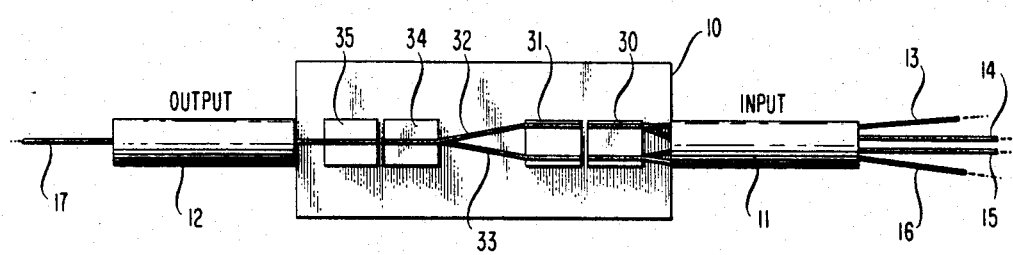
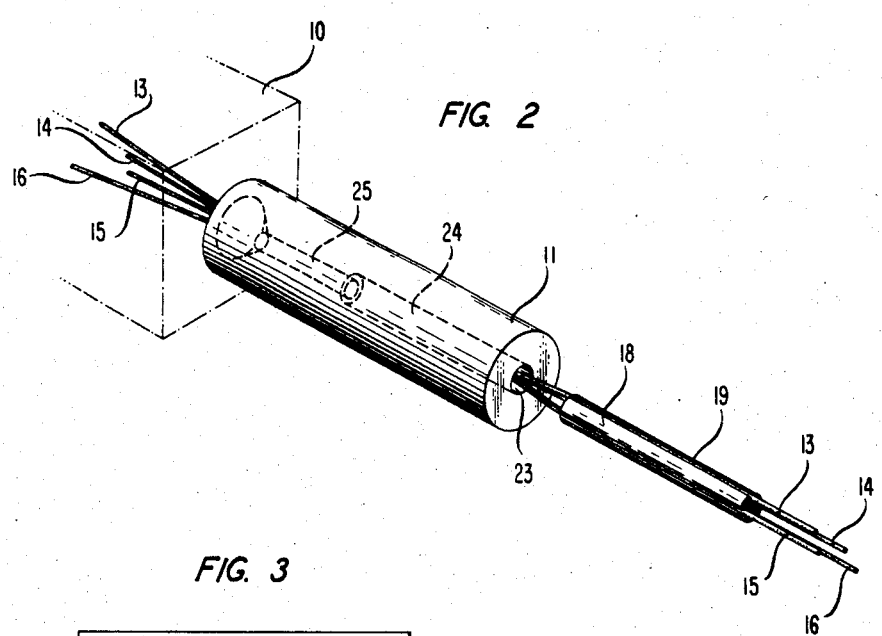
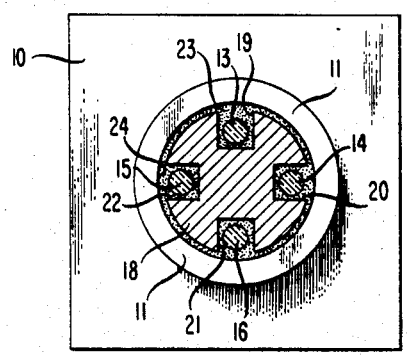

OPTICAL PACKAGES INCLUDING FIBER SEALS

BACKGROUND OF THE INVENTION

This invention relates to optical fiber systems, and in particular to a method and resulting component package which provide a fiber seal.

Seals are required or desirable for a variety of optical fiber components. In optical transmitters and receivers, for example, a seal is desirable to protect the components from moisture and contaminants in the environment. Further, in certain optical relays, the component housing is filled with refractive-index matching fluid which must be contained by the seal. One example of such a component is a sparing switch which provides for the switching of the optical path to a new light source when an old light source fails. (See, for example, U.S. patent application of W. C. Young, Ser. No. 432,254, filed Oct. 1, 1982, and assigned to Bell telephone Laboratories, Incorporated. (now U.S. Pat. No. 4,407,562)

Proposals have been made previously for providing optical fiber seals. For example, U.S. Pat. No. 4,119,363 issued to Camlibel et al suggests inserting a fiber through a cylindrical tube, filling the tube with solder and heating the solder so that an hermetic seal is formed upon cooling. The tube-fiber assembly is then inserted through an aperture in the component housing and soldered thereto. To some extent, this proposal relies upon the thermal expansion mismatch between the solder and fiber to form a good seal. In U.S. Pat. No. 4,413,881 issued to Kovats, it is suggested that thermal expansion mismatches could be avoided by injecting a molten alloy of bismuth and tin into the tube containing the fiber so that a seal would form upon solidification of the alloy. The tube could then be soldered to the component housing. Alternatively, the tube could be replaced by a mold which included a cylindrical chamber for forming the seal and square section passages adjacent to the chamber for placement of the fiber. After the seal is formed, the fiber is removed from the mold and the alloy is soldered directly to the component housing.

While these proposals appear adequate, it is desirable to improve hermetic fiber seals in general by minimizing the cross-sectional area of the adhesive joint. Further, it is desirable in many instances to avoid solder seals, which require removal of the protective coating surrounding the fiber and have a tendency to make the fibers brittle. This is especially important in components such as sparing switches where some movement of the fibers occurs within the component housing. Further, it is desirable to provide some means of sealing a plurality of fibers for optical packages, such as sparing switches, which require multiple optical paths at their input and/or output.

It is therefore an object of the invention to provide an improved seal for one or more fibers in an optical package.

SUMMARY OF THE INVENTION

This and other objects are achieved in accordance with the invention, which in one aspect is a method of fabricating an optical package including sealing an optical fiber. A housing is provided including an opening therein. At least one optical fiber is placed in an aperture in an insert member having a size slightly less than that of the opening. The fiber extends through the opening in the housing. A sealing material is deposited at some area along the fiber. The insert is then pushed into the opening so as to force the sealing material through the aperture of the insert and thereby fill the space between the fiber, the insert, and the opening to seal the fiber.

In another aspect, the invention is an optical package including an optical fiber seal. The package includes a housing with an opening therethrough. At least one optical fiber extends through the opening in the housing. An insert member is positioned within the opening, which member includes at least one aperture in which the optical fiber is situated. A sealing material fills the space between the fiber, insert, and opening so as to form an hermetic seal.

BRIEF DESCRIPTION OF THE DRAWING

These and other features of the invention are delineated in detail in the following description. In the drawing:

FIG. 1 is a side view of an optical package which may include a seal in accordance with one embodiment of the invention;

FIG. 2 is a perspective view of a portion of the package and optical fibers during one stage of fabrication in accordance with the same embodiment; and FIG. 3 is a cross-sectional view of a portion of the package at a subsequent stage of fabrication in accordance with the same embodiment.

It will be appreciated that, for purposes of illustration, these Figures are not necessary drawn to scale.

DETAILED DESCRIPTION

FIG. 1 illustrates schematically one example of an optical device which may utilize the present invention. The particular example chosen was a sparing switch, but it will be appreciated that the invention is applicable to other packages where a fiber seal is used, such as optical transmitters, receivers and transceivers.

The switch includes a component housing, 10, which in this example comprises an alloy of Be and Cu. The housing includes at its input and output faces, cylindrical portions, 11 and 12, respectively, through which optical fibers, 13-16 and 17, are inserted in a manner to be described. It will be noted that this particular device requires four fibers at the input and one fiber at the output, but the invention should be applicable to any number of fibers.

Within the housing, 10, the fibers are mounted into grooved silicon chip assemblies which are either fixed (two rows of fibers sandwiched between three silicon chips) or movable (one row of fibers sandwiched between two silicon chips). Fibers 13-16 are mounted in a fixed assembly. For purposes of illustration, the middle chip, 30, of this assembly is schematically shown along with one row of fibers. (It will be appeciated that a row of fibers and grooves extends vertically in this Figure.) Adjacent to the assembly in which fibers, 13-16, are mounted is a movable assembly, which includes chip, 31, with fibers, 32 and 33, mounted in a single row of grooves. The latter fibers extend to an adjacent, fixed silicon chip assembly, which includes chip, 34, so that each fiber is mounted in its own row of grooves and at the same elevation. Adjacent to this fixed assembly is another movable assembly which includes chip, 35, having fiber, 17, mounted therein. Upon failure of the light source coupled to one of the input fibers, the output fiber, 17, is moved into alignment with another input fiber coupled to another source by a horizontal movement of one or both of the movable assemblies. The housing also typically includes a refractive-index matching liquid for maximum coupling between the fibers, which necessitates a seal for the housing. It will be appreciated that many details of the switch, such as the means for mechanical movement and guidance have been omitted for the sake of clarity in the Figure. (For a more detailed discussion of an optical sparing switch, see U.S. patent application of W. C. Young cited supra.)

The method of providing the seal for the package is illustrated in FIG. 2. After fibers, 13-16, were mounted in the silicon chip assembly, they extended through the opening in the cylindrical portion, 11, of the housing, 10. The opening included adjacent portions, 24 and 25, of unequal diameters for reasons discussed later. An insert member, 18, was provided which was essentially cylindrical with a diameter slightly less than the diameter of the larger portion 24, so it can more easily fit therein. In this example, the diameter of the insert was approximately 54 mils and that of opening, 24, was 55 mils. In general, a 1-3 mil difference between the outer diameter of the insert and the diameter of the opening would be utilized. The length of the insert and that of the larger opening was approximately 0.7 inches. The diameter of opening, 25, was 31 mils and was 0.3 inches long. The insert also included a plurality of slotted portions, 19-22, around its circumference, each slot adapted to receive one of the fibers, 13-16. (See also FIG. 3.) The material of the insert is chosen to be one with a coefficient of expansion closely matching that of the housing material. In this example, the insert material was beryllium-copper which was the same material as the housing.

A portion of each fiber, 13-16, extending through the opening, 24, was placed in a corresponding slot, 19-22, of the insert, 18. A portion of the opening, 24, was filled with a sealing material, illustrated as the stippled material, 23. In this example, the material was epoxy, and in particular a mixture of 100 parts by weight of a biphenol A type epoxy resin (sold by Shell Chemical Company under the trademark Epon 828) and 35 parts by weight of a room temperature curing amine (sold by Texaco, Inc. under the trademark Jeffamine T-403). To increase the viscosity of the epoxy, 135 parts by weight of silica powder was added. The silica powder was Insil A-25 (sold by Illinois Mineral Compnay under the trademark Insil A-25). After thoroughly mixing, the material was degassed and deposited into opening, 24, by a syringe so as to fill approximately 20 percent of the volume of the opening. Alternatively, the sealing material could be applied to the insert, 18, so as to fill the slots, 19-22, therein. In the latter case, a small amount of epoxy could also be deposited in the opening, 24, to insure that some epoxy will be transferred to the smaller opening, 25, in the next step. Epoxy is preferred for this particular component package since the protective fiber coating does not have to be stripped as is required for solder seals. This stripping would have a tendency to make the fibers brittle and therefore movement of the fibers during assembly and/or during the operation of the switch will not cause the fibers to break. In other types of devices, however, such as transmitters and receivers, use of a solder sealing material may be used in accordance with the invention to produce hermetic seals.

Next, the insert, 18, with the fibers located in the slots, was pushed into the opening, 24. This step produced a piston action whereby the epoxy was forced through the smaller diameter opening, 25, and also through the slots, 19-22, of the insert as well as the small gap between the outer surface of the insert and the wall of opening, 24. Thus, as illustrated in the end view of FIG. 3, the entire space between the fibers, 13-16, the insert, 18, and the opening, 24, was filled so that the package was sealed. Subsequently, the resulting structure was heated in accordance with standard procedures to cure the epoxy. Typically, heating at approximately 60° C. for approximately 12 hours would be appropriate. The slotted insert remained as a permanent part of the package within the opening, 24.

The use of the two different diameter openings, 24 and 25, is advantageous in that it aids in the flow of the epoxy by permitting a piston action, and it also provides a stoop for the insert. It may be possible, however, to provide an opening of only a single diameter and still produce the desired results.

The use of the insert, 18, in the resulting product of the invention provides advantages in addition to producing the piston action previously mentioned. The primary advantage of the inert is that it minimizes the cross-sectional area of the adhesive joint relative to the length of the joint in order to produce a very strong seal. In this example, the insert slots were 12 mils wide and varied linearly from 20 mils deep at the intersection of the large and small openings to 12 mils deep at the opposite end of the larger opening. This variation in slot depth results in a tapered path for the fibers thus avoiding an abrupt transition from the larger to the smaller openings. The fibers, including their coating, were approximately 9 mils in diameter. (The bare glass fibers were approximately 5 mils in diameter.) The sealing material was spread over essentially the entire length of the larger opening, which was approximately 0.7 inches. It will be appreciated that the parameters given are illustrative and can be varied according to particulr needs.

A further advantage of the insert is that it has a coefficient of expansion which is equal or close to that of the portion, 11, of the housing through which the fibers are inserted. This match minimizes the stresses on the fibers to further strengthen to seal.

It will be appreciated that the same procedure described above may be utilized to seal the output fiber, 17, of FIG. 1, in the cylindrical portion, 12. In this case, an insert with a single slot on a portion of the periphery may be used.

While it is preferred to use slots formed on the periphery of the insert, it will be appreciated that other types of apertures may be employed such as holes formed through the body of the insert by molding, casting or drilling. If the opening in the housing is square or rectangular, the apertures could take the form of beveled surface at the corners of the square or rectangular insert.

Various additional modifications of the invention will become apparent to those skilled in the art. All such variations which basically rely on the teachings through which the invention has advanced the art are properly considered within the spirit and scope of the invention.

What is claimed is:

1. A method of fabricating an optical package including sealing an optical fiber comprising the steps of:
   providing a housing including an opening therein having a front and back end;
   placing at least one optical fiber in an aperture having a front and back end in an insert member having a size less than that of the opening, the fiber also extending through the opening of the housing;

depositing a sealing material along a portion of the fiber between the front end of the opening and the back end of the aperture; and pushing the insert into the opening so as to force the sealing material through the aperture of the insert and thereby fill the space between the fiber, the insert and the opening to seal the fiber.

2. The method according to claim 1 wherein the opening in the housing includes adjacent openings of unequal size, and the insert is pushed into the larger-sized opening.

3. The method according to claim 1 wherein a plurality of fibers are sealed in the housing by placing each in a separate aperture in an insert member comprising a plurality of apertures.

4. The method according to claim 1 wherein the sealing material comprises a material selected from the group consisting of epoxy and solder.

5. The method according to claim 1 wherein the sealing material comprises epoxy.

6. The method according to claim 1 wherein the sealing material is deposited in the opening.

7. The method according to claim 1 wherein the sealing material is deposited in the aperture of the insert.

8. The method according to claim 1 wherein the housing is an integral part of a larger housing which encloses optical components.

9. The method according to claim 1 wherein the housing and the opening therein are cylindrical, and the insert is also cylindrical with at least one slot formed in the periphery.

10. A method of fabricating an optical package including sealing a plurality of optical fibers comprising the steps of:

providing a cylindrical housing including a cylindrical opening therethrough comprising adjacent openings of unequal diameters, the larger diameter opening having a front end adjacent to the smaller diameter opening and a back end;

placing each fiber in a different slot in a cylindrical insert member having a plurality of slots with a front end and a back end around its periphery, the fibers also extending through the opening in the housing and the insert having a diameter slightly less than that of the larger-size opening;

depositing an epoxy material at some area along the fibers between the front end of the larger diameter opening and the back end of the slots; and pushing the insert into the larger diameter opening so as to force the epoxy through the smaller diameter opening and through the slots in the insert thereby filling the space between the fibers, the insert, and the opening to seal the fibers.

* * * * *